US010234008B2

(12) United States Patent
Arhab et al.

(10) Patent No.: US 10,234,008 B2
(45) Date of Patent: Mar. 19, 2019

(54) HYDROKINETIC TORQUE COUPLING DEVICE HAVING AXIALLY MOVABLE TURBINE-PISTON AND LOCKUP CLUTCH, AND RELATED METHODS

(71) Applicant: VALEO EMBRAYAGES, Amiens (FR)

(72) Inventors: Rabah Arhab, Saint-Brice-Sous-Foret (FR); Alfonso Medellin, San Luis Potosí (MX); Jorge Sanchez, San Luis Potosi (MX)

(73) Assignee: Valeo Embrayages, Amiens (FR)

( * ) Notice: Subject to any disclaimer, the term of this patent is extended or adjusted under 35 U.S.C. 154(b) by 215 days.

(21) Appl. No.: 15/168,954

(22) Filed: May 31, 2016

(65) Prior Publication Data

US 2017/0343092 A1 Nov. 30, 2017

(51) Int. Cl.
*F16H 45/02* (2006.01)
*F16F 15/00* (2006.01)
(Continued)

(52) U.S. Cl.
CPC ............ *F16H 45/02* (2013.01); *F16D 13/40* (2013.01); *F16D 25/0635* (2013.01);
(Continued)

(58) Field of Classification Search
CPC ............. F16H 45/02; F16H 2045/0205; F16H 2045/0221; F16H 2045/0284
See application file for complete search history.

(56) References Cited

U.S. PATENT DOCUMENTS 2,130,895 A 9/1938 Ness
2,860,747 A 11/1958 Kelley
(Continued)

FOREIGN PATENT DOCUMENTS

DE 1550957 A1 7/1969
DE 2245901 A1 4/1974
(Continued)

OTHER PUBLICATIONS

Lindemann et al., "iTC—Innovative Solutions for Torque Converters Pave the Way into the Future", Torque Converter, Schaeffler Symposium book 2014, pp. 280-301, Schaeffler Technologies AG & Co. KG.

*Primary Examiner* — Richard M Lorence
(74) *Attorney, Agent, or Firm* — Berenato & White, LLC

(57) ABSTRACT

A hydrokinetic torque coupling device comprises a casing, a torque converter, a torsional vibration damper and a lockup clutch disposed within the casing. The torque converter comprises an impeller and a turbine-piston coaxially aligned with the impeller and axially movable toward and away from the casing to position the hydrokinetic torque coupling device into and out of a lockup mode in which the turbine-piston is non-rotatably frictionally coupled to the casing. The torsional vibration damper comprises an input member non-moveably secured to the turbine-piston, a first retainer plate and the elastic members elastically coupling the input member to the first retainer plate. The input member includes an actuating portion configured to actuate the lockup clutch. The lockup clutch is disposed within the casing between the actuating portion of the input member and a cover shell of the casing for frictionally coupling the casing and the turbine-piston.

20 Claims, 4 Drawing Sheets

(51) Int. Cl.
  *F16D 13/40* (2006.01)
  *F16D 25/0635* (2006.01)
  *F16D 33/18* (2006.01)
  *F16H 39/42* (2006.01)

(52) U.S. Cl.
  CPC .............. *F16D 33/18* (2013.01); *F16F 15/00* (2013.01); *F16H 39/42* (2013.01); *F16D 2300/22* (2013.01); *F16H 2045/0205* (2013.01); *F16H 2045/0221* (2013.01); *F16H 2045/0284* (2013.01)

(56) References Cited

U.S. PATENT DOCUMENTS

| 2,992,713 | A | 7/1961 | Stump et al. |
| 3,041,892 | A | 7/1962 | Schjolin |
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 9,752,667 | B2 * | 9/2017 | Depraete ................. F16H 45/02 |
| 2003/0168298 | A1 | 9/2003 | Holler et al. |
| 2003/0168299 | A1 | 9/2003 | Holler et al. |
| 2004/0011032 | A1 | 1/2004 | Holler et al. |
| 2006/0086584 | A1 | 4/2006 | Maucher et al. |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0021135 | A1 | 1/2015 | Jameson |
| 2015/0027110 | A1 | 1/2015 | Lindemann et al. |
| 2015/0037158 | A1 | 2/2015 | Steinberger et al. |
| 2015/0068857 | A1 | 3/2015 | Lindemann et al. |
| 2017/0204954 | A1 * | 7/2017 | Maienschein ........... F16H 45/02 |

FOREIGN PATENT DOCUMENTS

| DE | 10226860 A1 | 12/2003 |
| EP | 0125428 A1 | 11/1984 |
| EP | 1744074 A2 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | S58-131466 A | 8/1983 |
| KR | 1013115310000 B1 | 9/2013 |
| WO | WO2004018897 A1 | 3/2004 |
| WO | WO2004046574 A1 | 6/2004 |

* cited by examiner

HYDROKINETIC TORQUE COUPLING DEVICE HAVING AXIALLY MOVABLE TURBINE-PISTON AND LOCKUP CLUTCH, AND RELATED METHODS

BACKGROUND OF THE INVENTION

1. Field of the Invention

The present invention generally relates to torque converters and hydrokinetic torque coupling devices, and more particularly to hydrokinetic torque coupling devices including clutches actuated by axially movable turbines of torque converters for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect comprises a casing rotatable about a rotational axis and comprising an impeller shell and a cover shell non-moveably connected to the impeller shell, a torque converter coaxially aligned with and rotatable about the rotational axis, a torsional vibration damper and a lockup clutch. The torque converter is disposed within the casing and comprises an impeller and a turbine-piston hydro-dynamically drivable by the impeller and coaxially aligned with the impeller, the turbine-piston being axially movable toward and away from the casing to position the hydrokinetic torque coupling device into and out of lockup mode in which the turbine-piston is non-rotatably frictionally coupled to the casing. The torsional vibration damper comprises an input member rotatable about the rotational axis and non-movably secured to the turbine-piston, a first retainer plate rotatable relative to the input member coaxial with the rotational axis and a plurality of damper elastic members interposed between the first retainer plate and the input member. The input member including an actuating portion. The damper elastic members elastically couple the input member to the first retainer plate. The lockup clutch is disposed within the casing, between the actuating portion of the input member and the cover shell of the casing for frictionally coupling the casing and the turbine-piston. The actuating portion of the input member is configured to actuate the lockup clutch.

According to a second aspect of the invention, there is provided a method of assembling a hydrokinetic torque coupling device for coupling together a driving shaft and a driven shaft together. The method of this second aspect comprises the steps of providing an impeller shell and a cover shell of a casing, providing a preassembled torque converter comprising an impeller, a turbine-piston and a stator, and providing a preassembled torsional vibration damper rotatable about a rotational axis and comprising an input member including an actuating portion, a first retainer plate coaxially with and rotatable relative to the input member, and a plurality of damper elastic members interposed between the first retainer plate and the input member. The damper elastic members elastically couple the input member to the first retainer plate. The method of this second aspect further comprises the steps of non-movably securing the input member of the torsional vibration damper to the turbine-piston of the torque converter coaxially with the rotational axis, positioning a lockup clutch within the cover shell of the casing, mounting the cover shell to the impeller shell so that the lockup clutch is disposed between the input member and the cover shell coaxially with the rotational axis for frictionally coupling the casing and the turbine-piston, and non-movably securing the impeller shell to the cover shell so as to define the casing.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
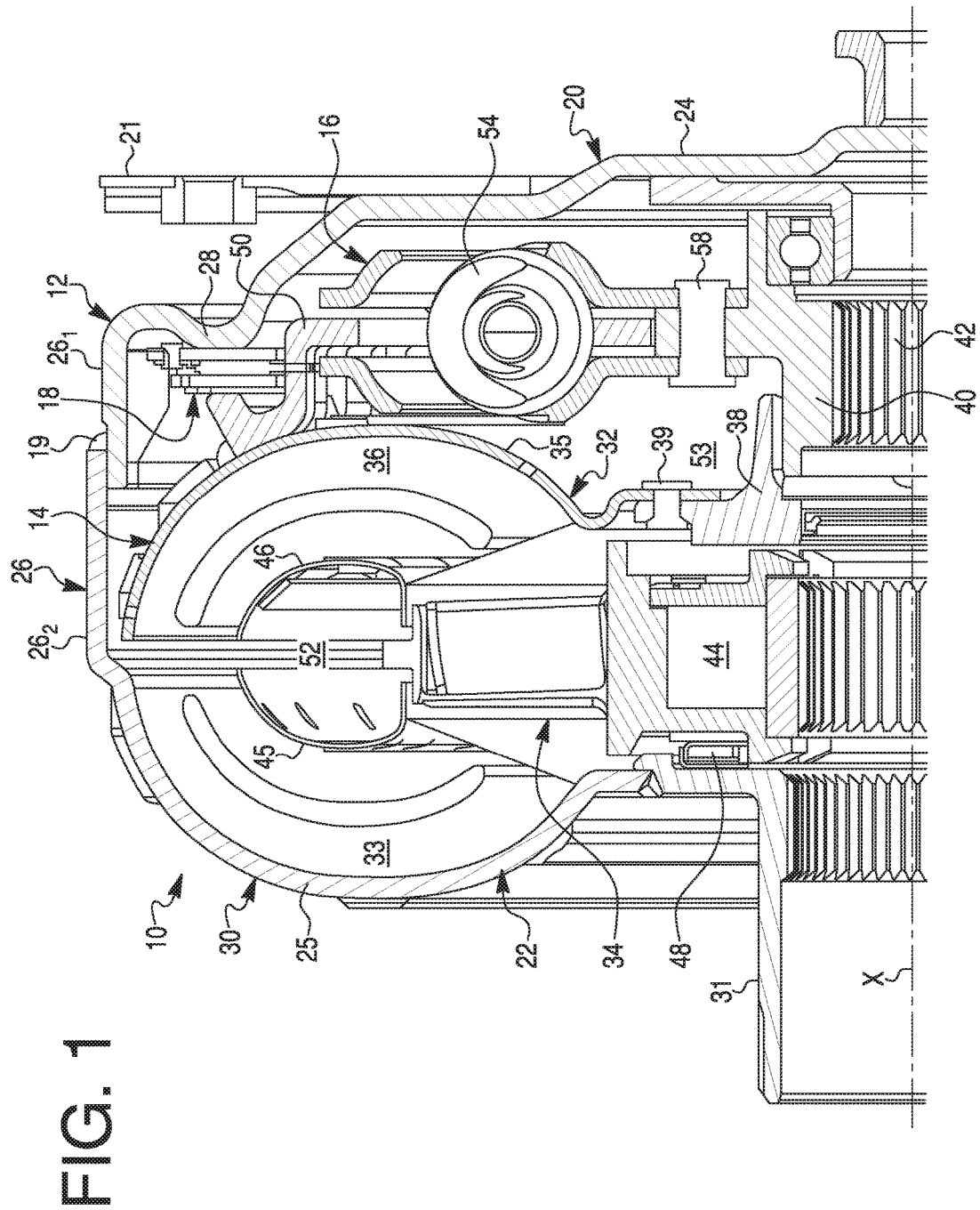
FIG. 1 is a fragmented half-view in axial section of a hydrokinetic torque coupling device equipped with a turbine-piston in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 2:
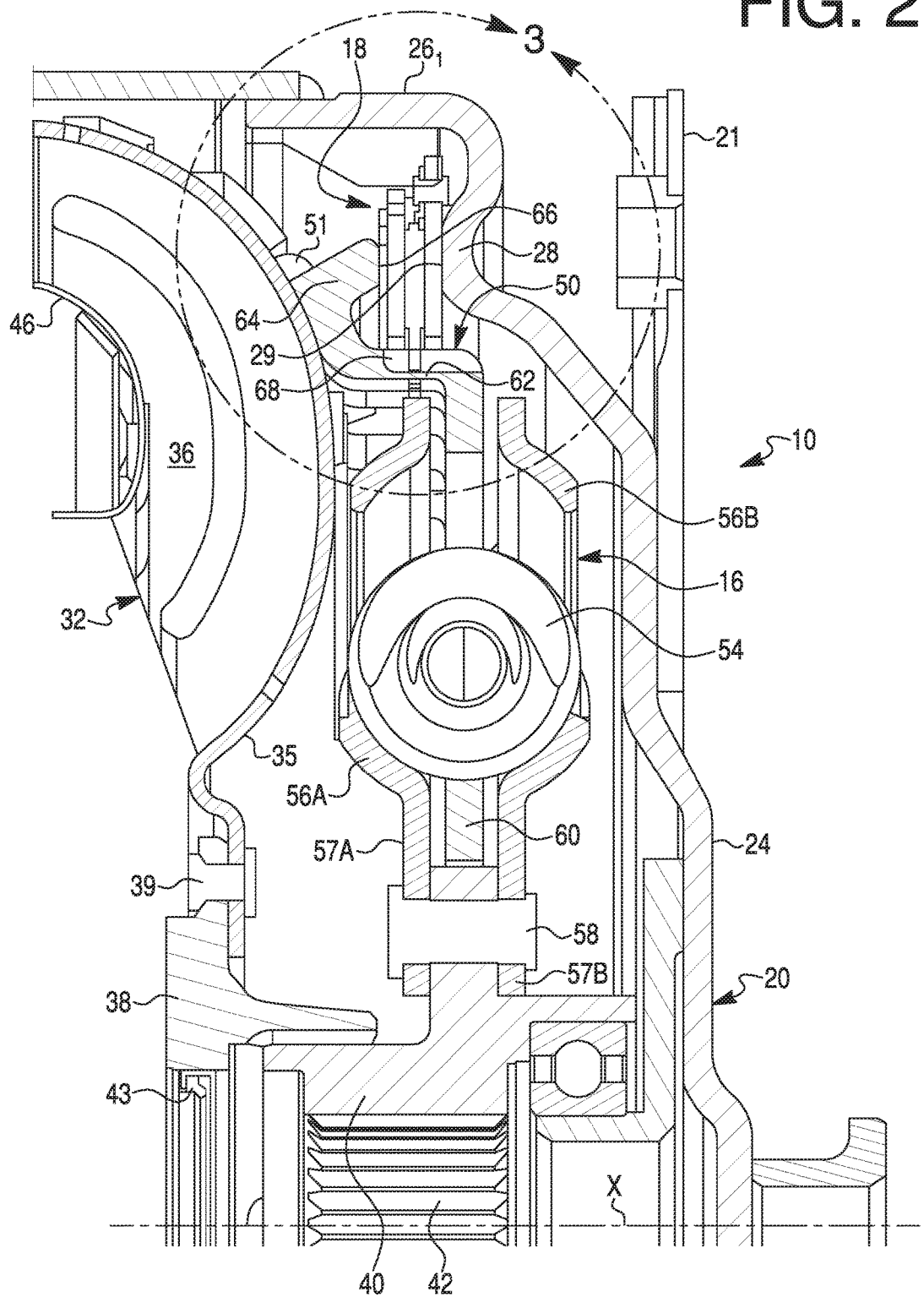
FIG. 2 is an enlarged fragmented half-view in axial section of the hydrokinetic torque coupling device of FIG. 1.

An exemplary embodiment of a hydrokinetic torque coupling device is generally represented in FIGS. 1 and 2 by reference numeral 10. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The hydrokinetic torque coupling device 10 further comprises a hydrodynamic torque converter 14, a torsional vibration damper (also referred to herein as a damper assembly) 16, and a lock-up clutch 18, all disposed within the sealed casing 12.

The sealed casing 12, the hydrodynamic torque converter 14, the torsional vibration damper 16 and the lock-up clutch 18, are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing (or cover) shell 20 and a second casing (or impeller) shell 22 fixedly connected sealingly together, such as by welding at weldment 19 at their outer peripheries, so as to be non-movable relative to one another. The first casing shell 20 is non-rotatably connected to the driving shaft, more typically to a flywheel (not shown), to which it is fixed to so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with a flexplate 21, shown in FIG. 1.

Each of the first and second casing shells 20, 22 may be made, for example, integrally by press-forming one-piece metal sheets.

The first casing shell 20 includes a first sidewall 24 extending substantially radially relative to the rotational axis X (i.e., in a plane that is generally transverse to the rotational axis X) and a cylindrical first outer wall portion $26_1$ extends substantially axially from the first sidewall 24 toward the second casing shell 22. Similarly, the second casing shell 22 includes a second sidewall 25 extending substantially radially relative to the rotational axis X and a cylindrical second outer wall portion $26_2$ extending substantially axially from the second sidewall 25 toward the first casing shell 20. The first sidewall 24 includes an integral engagement portion 28 having an engagement surface 29, as best shown in FIG. 2. The engagement portion 28 is preferably integral with the first sidewall 24 of the first casing shell 20, e.g., made of a single or unitary component. The first and second outer wall portions $26_1$, $26_2$ collectively establish an annular outer wall 26 substantially parallel with the rotational axis X. The weldment 19 fixedly secures the outer wall portions $26_1$ and $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The impeller 30 includes an impeller shell. According to the exemplary embodiment of the present invention, the second casing shell 22 of the casing 12 may forms and serve as the impeller shell of the impeller 30. Accordingly, the impeller shell 22 sometimes is referred to as part of the casing 12. The impeller 30 further includes a core ring 45, and a plurality of impeller blades 33 fixedly attached, such as by brazing, to the impeller shell 22 and the core ring 45. The impeller 30, including the impeller shell 22, the core ring 45, and the blades 33, are fixedly secured to the first casing shell 20 so as to be non-rotatable relative to the first casing shell 20 and hence to the driving shaft (or flywheel) of the engine, so that the impeller 30 rotates at the same speed as the engine output. The impeller 30 also includes an impeller hub 31 fixedly (i.e., non-movably) secured to the impeller shell 22, as best shown in FIG. 1. The impeller hub 31 is arranged for engagement with a hydraulic pump of the transmission.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines. Alternatively, a weldment or other connection may be used to fix the output hub 40 to the driven shaft.

The turbine-piston 32 is a consolidation or incorporation of a turbine with a lockup clutch piston. The turbine component of the turbine-piston 32 includes a turbine shell 35, a core ring 46, and a plurality of turbine blades 36 fixedly attached, such as by brazing, to the turbine shell 35 and the core ring 46. The spinning of the impeller 30 causes transmission fluid in the torus to spin the turbine blades 36, and hence the turbine-piston 32. The impeller shell 22 and the turbine shell 35 collectively define a substantially toroidal first chamber (or torus chamber) 52 therebetween. Viewing FIG. 1, the torus chamber 52 is to the left side of the turbine shell 35, and a second (or damper) chamber 53 is to the other (right) side of the turbine shell 35. In other words, the first chamber 52 is defined between the impeller casing shell 22 and the turbine shell 35, while the second chamber 53 is defined between the turbine shell 35 and the cover shell 20.

The torque coupling device 10 further includes a turbine hub 38 rotatable about the rotational axis X, which is arranged to non-rotatably couple together the driven shaft and the turbine-piston 32. A radially inner end of the turbine shell 35 of the turbine-piston 32 is non-movably (i.e., fixedly) secured to the turbine hub 38 by appropriate means, such as by rivets 39 or welding. The turbine hub 38 is rotatable about the rotational axis X and is coaxial with the driven shaft, so as to center the turbine-piston 32 on the driven shaft. Moreover, the turbine hub 38 (with the turbine-piston 32) is axially displaceable along the rotational axis X. Also, as discussed in further detail below, the turbine-piston 32 (with the turbine hub 38 fixed thereto) is axially movable relative to the output hub 40 into and out of lockup mode. In other words, the turbine-piston 32 is axially movable toward and away from the impeller shell 20 between the lockup (or engaged) position (the lockup mode) and the non-lockup (open) position (a non-lockup mode). A sealing member (or sealing ring) 43 is positioned between the turbine hub 38 and the transmission input shaft. The sealing member 43, mounted to a radially inner peripheral surface of the turbine hub 38, creates a seal at the interface of the transmission input shaft and the turbine hub 38.

Returning to FIG. 1, the stator 34 is positioned between the impeller 30 and the turbine-piston 32 to redirect fluid from the turbine-piston 32 back to the impeller 30 in an efficient manner. The stator 34 is typically mounted on a one-way clutch 44 to prevent the stator 34 from counter-rotating. A thrust bearing 48 is interposed between the stator 34 and the impeller hub 31 (as shown in FIG. 1) or the casing 12.

The torsional vibration damper 16 is housed in the casing 12 axially between the turbine-piston 32 and the first sidewall 24 of the casing 12, as best shown in FIG. 1. The output hub 40 forms an output of the torsional vibration damper 16 and the driven side of the torque coupling device 10, and is splined with the driven shaft. The turbine-piston 32, on the other hand, forms an input of the torsional vibration damper 16.

As best shown in FIG. 2, the torsional vibration damper 16 comprises a substantially annular drive (or input) member 50 non-movably (i.e., fixedly) secured to the turbine shell 35 of the turbine-piston 32, a plurality of circumferentially acting damper elastic members (or torque transmitting elements) 54, and substantially annular first and second retainer plates 56A and 56B, respectively. The first and second retainer plates 56A and 56B are fixedly (i.e., non-movably) secured to one another and together define an output member. The input member 50 is fixedly (i.e., non-movably) secured to the turbine shell 35 of the turbine-piston 32 coaxially with the rotational axis X by appropriate means, such as by weldment 51 (as best shown in FIG. 2) or rivets.

The first and second retainer plates 56A, 56B are axially mounted to opposite sides of the input member 50 so as to be oriented parallel to and axially spaced from each other and coaxial with the rotational axis X. Moreover, the first and second retainer plates 56A, 56B are arranged axially on either side of the elastic members 54 and are operatively connected therewith. The first and second retainer plates 56A, 56B are non-movably (i.e., fixedly) secured to the output hub 40 and to one another by appropriate means, such as by rivets 58 (as best shown in FIG. 2) or welding. Specifically, the first and second retainer plates 56A, 56B are non-movably (i.e., fixedly) secured to the output hub 40 and to each other so that substantially annular inner mounting flanges 57A, 57B of the first and second retainer plate 56A, 56B engage the axially opposite surfaces of the output hub 40 via the rivets 58 extending through circumferentially spaced holes in the inner mounting flanges 57A, 57B of the first and second retainer plates 56A, 56B and through corresponding holes in the output hub 40.

The circumferentially oriented damper elastic members 54 are disposed in series relative to each other between the input member 50 and the first and second retainer plates 56A, 56B. According to the exemplary embodiment of the present invention, the damper elastic members 54 are identical to each other. In non-limiting fashion and according to the exemplary embodiment of the present invention, each of the damper elastic members 54 is in the form of helical (or coil) spring having a principal axis oriented substantially circumferentially. Furthermore according to the exemplary embodiment of the present invention, each of the damper elastic members 54 includes only one helical spring. Alternatively, each of the damper elastic members 54 may include a pair of coaxially oriented helical springs. Specifically, each of the damper elastic members 54 may include an external large-diameter spring and an internal small-diameter spring, arranged coaxially so that the internal spring is disposed within the external spring.

As illustrated in FIGS. 1 and 2, the input member 50 is elastically connected to the first and second retainer plates 56A, 56B through the elastic members 54. In other words, the input member 50 is rotatable relative to the first and second retainer plates 56A, 56B. In turn, the first and second retainer plates 56A, 56B are non-movably connected to the output hub 40. Therefore, the torsional vibration damper 16 elastically couples the turbine-piston 32 to the output hub 40.

The input member 50 includes a generally annular, radially extending central portion 60 coaxial with the rotational axis X, a generally annular connection portion 62 formed integrally with and extending substantially axially from the central portion 60, and an actuating portion 64 formed integrally with and radially outwardly extending from the connection portion 62. The connection portion 62 and the actuating portion 64 define a radially outer end of the input member 50. Preferably, the central portion 60, the connection portion 62 and the actuating portion 64 are made of a single-piece component, but may be separate components fixedly (i.e., non-moveably) connected together. In other words, the input member 50 is a unitary component including integrally formed portions 60, 62 and 64. A free axially distal end of the actuating portion 64 of the input member 50 defines a piston engagement surface 66.

Figure 3:
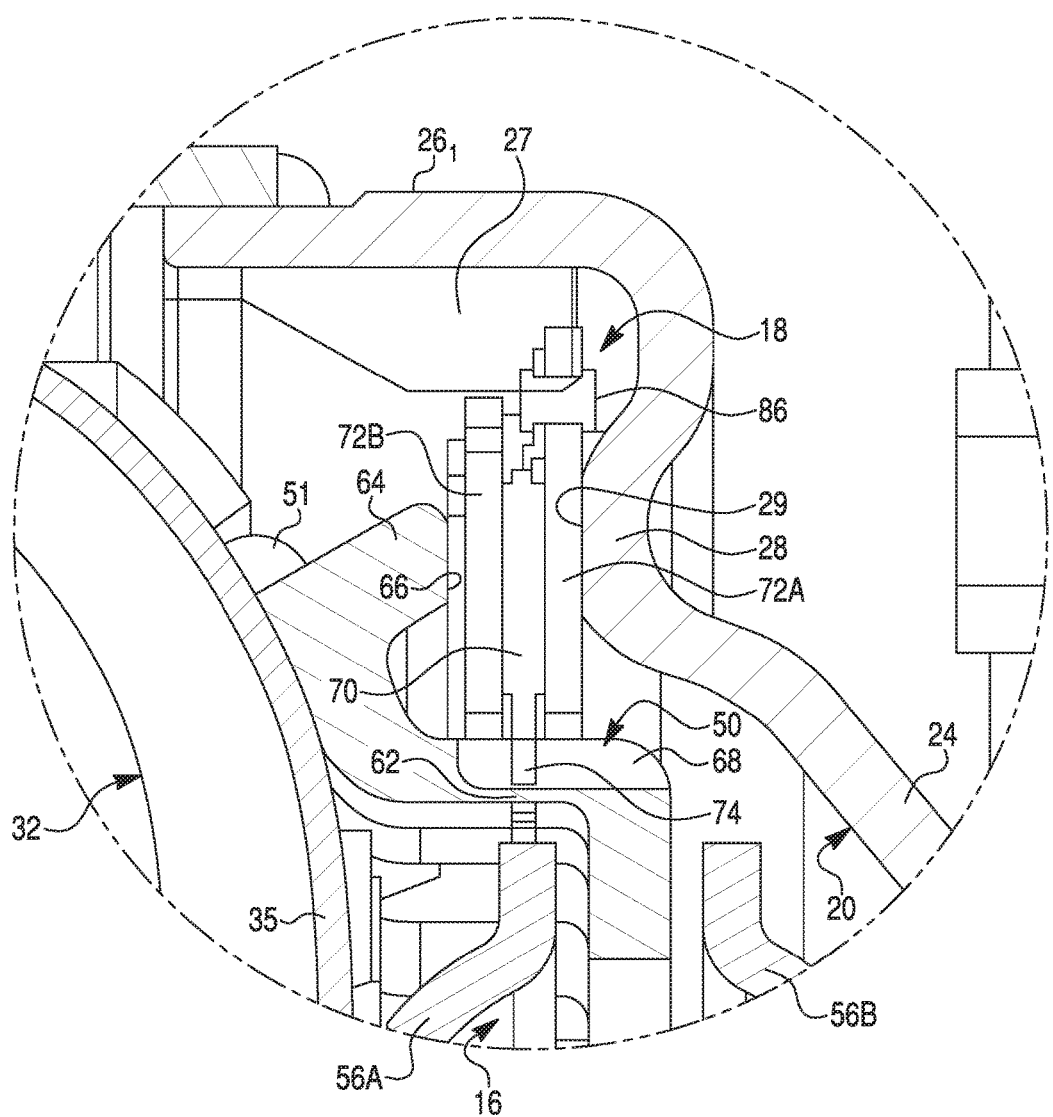
FIG. 3 is an enlarged front view of a fragment of the hydrokinetic torque coupling device shown in the circle "3" of FIG. 2.

The lock-up clutch 18 in accordance with the exemplary embodiment of the present invention comprises at least one inner clutch plate (or friction disc) 70 coaxial with the rotational axis X, and first and second outer clutch plates (or backing discs) 72A and 72B, respectively, coaxial with the rotational axis X. As best shown in FIG. 3, the friction disc 70 and the backing discs 72A and 72B are oriented substantially perpendicularly relative to the rotational axis X.

Figure 4:
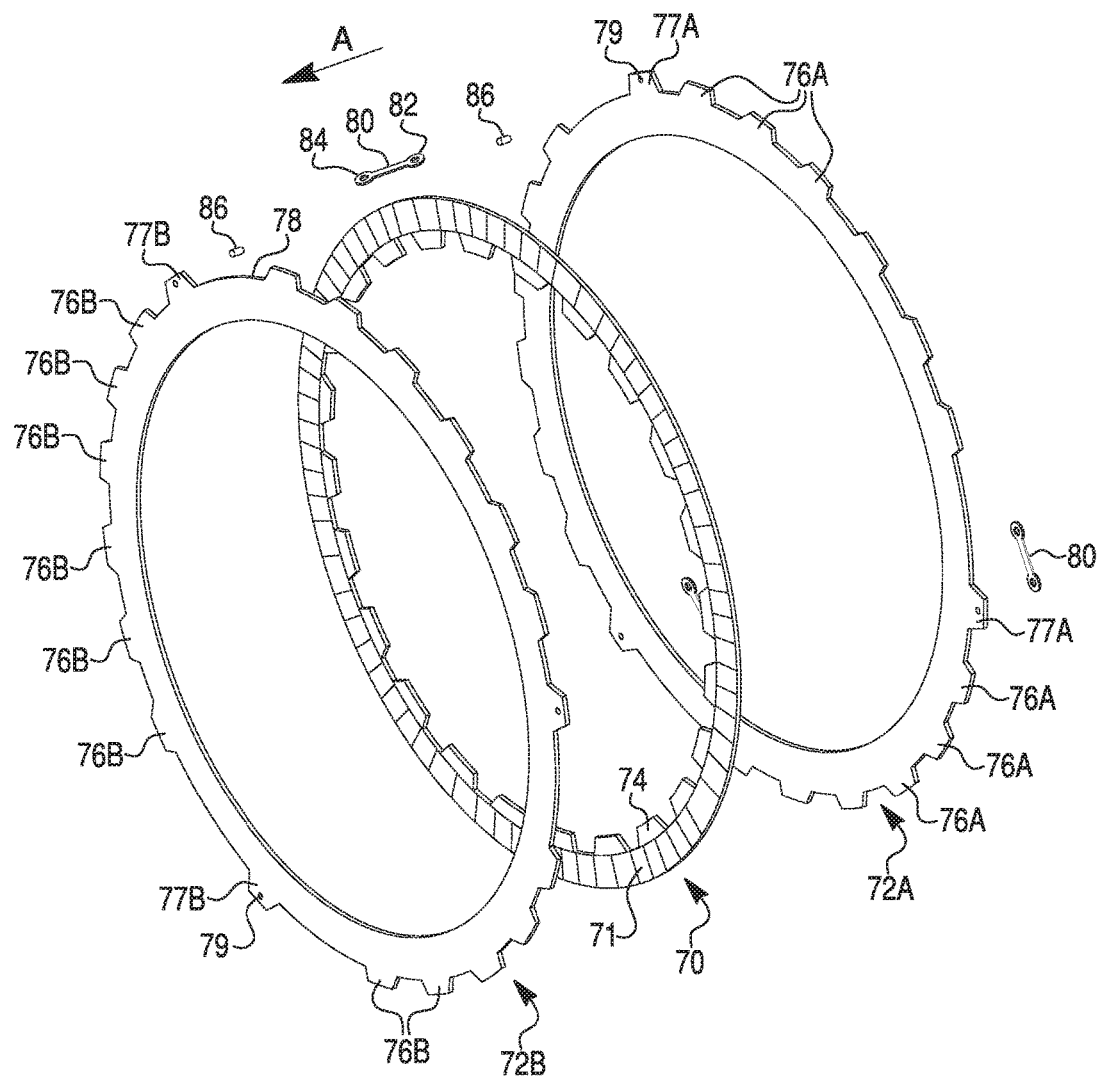
FIG. 4 is an exploded assembly view illustrating a lock-up clutch of the hydrokinetic torque coupling device of FIG. 1.

As illustrated on FIG. 4, the friction disc 70 has an annular shape. Each of radial front and rear faces of the friction disc 70 is covered with an annular friction lining 71, which, depending on the design, can be annular segmented or annular grooved. As illustrated in FIG. 3, the friction disc 70 is disposed between the first and second backing discs 72A and 72B. The friction disc 70 is non-rotatably coupled to (i.e., rotates as one with) and is axially movable relative (i.e., slidably mounted) to the connection portion 62 of the input member 50 of the torsional vibration damper 16. For this purpose, as further illustrated in FIG. 4, the friction disc 70 comprises one or more radially extending guide teeth 74, extending radially inwardly from an inner peripheral edge thereof towards the connection portion 62 of the input member 50. At the same time, a radially outer cylindrical peripheral surface of the connection portion 62 of the input member 50 of the torsional vibration damper 16 has a plurality of axially oriented grooves 68 circumferentially spaced from one another and complementary to the guide teeth 74 of the friction disc 70. In an assembled condition, each of the guide teeth 74 of the friction disc 70 is disposed in one of the complementary axial grooves 68 of the connection portion 62 of the input member 50, such that the friction disc 70 is axially slideable in the axial grooves 68. At the same time, the friction disc 70 is non-rotatable relative to the input member 50 of the torsional vibration damper 16 due to the guide teeth 74 disposed in the axial grooves 68 of the input member 50. In other words, the friction disc 70 is keyed or splined at the inner peripheral edge thereof to the connection portion 62 of the input member 50 of the torsional vibration damper 16.

The backing discs 72A and 72B are arranged so that the friction disc 70 is interposed axially between the two backing discs 72A and 72B. The first and second backing discs 72A and 72B according to the exemplary embodiment are substantially structurally and geometrically identical. In view of these similarities, and in the interest of simplicity, the following discussion will use a reference numeral without a letter to designate an entire group of substantially identical structures. For example, the reference numeral 72 will be used when generically referring to each of the first and second backing discs 72A and 72B rather than reciting both reference numerals.

As best shown in FIG. 4, the backing disc 72 has an annular shape with the substantially same dimensions as the friction disc 70. Thus, the guide teeth 74 of the friction disc 70 extend radially inwardly beyond an internal peripheral edge of the backing disc 72. The backing disc 72 is non-rotatably coupled to (i.e., rotates as one with) and is axially moveable relative (i.e., slidably mounted) to the cylindrical first outer wall portion $26_1$ of the first casing shell 20 of the casing 12.

For this purpose, as further illustrated in detail in FIG. 4, the backing disc 72 has one or more radial guide teeth 76 and 77 (i.e., 76A, 76B and 77A, 77B), which extend radially outwardly from an outer peripheral edge towards the first outer wall portion $26_1$ of the first casing shell 20 of the casing 12. At the same time, a radially outer cylindrical peripheral surface of the first outer wall portion $26_1$ of the first casing shell 20 of the casing 12 has a plurality of axially oriented grooves 27 formed integrally with the first casing shell 20 of the casing 12 and complementary to the guide teeth 76, 77 of the backing discs 72. The guide teeth 76, 77 are preferably identical in shape and dimension. The guide teeth 76, 77 extend radially beyond an outer peripheral edge of the friction disc 70. Moreover, each of the backing discs 72 has the external radial teeth formed in three series of guide teeth 76, 77 distributed equiangularly around the backing disc 72. The guide teeth 76, 77 of a series are separated by a fixed angular pitch, known as a single interdental angular pitch. The guide teeth 76, 77 are distributed around the backing disc 72 with a fixed angular pitch, the single interdental angular pitch. The downstream end tooth 76, 77 of an upstream series is separated from the upstream end tooth 76, 77 of a following downstream series by a hollow 78 (illustrated in FIG. 4) of a double interdental angular pitch.

In an assembled condition, each of the guide teeth 76, 77 of the backing disc 72 non-rotatably but axially slidably engage the axial grooves 27 of the casing 12, such that the backing disc 72 is axially slideable along the axial grooves 27 of the casing 12. Thus, the backing disc 72 is non-rotatable and axially slideable relative to the casing 12. The backing discs 72 are thus keyed or splined at their outer peripheral edges to the first casing shell 20 of the casing 12.

During operation of the engine, the driving shaft turns non-cyclically and produces violent jolts. Whenever the lock-up clutch 18 is in the open position, the guide teeth 76, 77 of the backing discs 72 then come to knock against the upstream or downstream faces of the associated grooves 27 of the casing 12 due to inertia of the backing discs 72. To solve this problem, the lock-up clutch 18, according to the exemplary embodiment, further includes elastic preload elements which exert a preload torque to clamp the guide tooth 77 of each of the backing discs 72 circumferentially against one of either upstream or downstream faces of the axial grooves 27 of the casing 12. More particularly, the elastic preload elements exert a preload torque to separate the guide teeth 77 of two consecutive backing discs 72A, 72B circumferentially against each upstream face and downstream face of the grooves 27 of the casing 12 so that each backing disc 72 is constantly kept rotationally motionless with respect to the casing 12.

According to the exemplary embodiment, the elastic preload elements comprise elastically deformable circumferentially compression elements 80 which are interposed axially between the guide tooth 77A of the first backing disc 72A and the guide tooth 77B of the second backing disc 72B, such that the teeth 77A and 77B are arranged between the same grooves 27 of the casing 12. Thus, the elastic element 80 rests against two anchoring elements formed respectively by the guide tooth 77A of the first backing disc 72A and by the guide tooth 77B of the second backing disc 72B. The guide teeth 77A and 77B will be designated preload teeth 77A and 77B below.

The elastic elements 80 are configured to exert a circumferential separation force between the two preload teeth 77A and 77B and to produce a preload torque. Due to the preload, tooth 77A of the first backing disc 72A is pressed flat against the downstream face of one of grooves 27 of the casing 12, while the preload tooth 77B of the second backing disc 72B is pressed flat against the upstream wall of the consecutive grooves 27 of the casing 12. More particularly, the elastic preload elements according to the exemplary embodiment comprise three elastically compressed deformable elements 80, which are associated with three preload teeth 77 of each of the backing discs 72, and which are arranged regularly around the backing discs 72. Thus, the three elastic elements 80 are distributed at 120° from one another around the rotational axis X. The elastic elements 80 are all identical and are arranged in a similar way on the backing discs 72. Therefore only one of these elastic elements 80 will be described below.

To allow the elastic elements 80 to be inserted between the preload teeth 77, the latter are offset circumferentially in relation to one another by a single interdental angular pitch. Each of the backing discs 72 thus has external radial teeth 76, 77, which are formed in three series of teeth 76, 77 distributed equiangularly over the circumference of the backing disc 72. The guide teeth 76, 77 of a series are separated by a single interdental angular pitch. The downstream end tooth 76, 77 of an upstream series is separated from the upstream end tooth 76, 77 of a following downstream series by a hollow 78 of a double interdental angular pitch.

The deformable elements are formed by an elastically flexible strip 80 in a radial plane which extends circumferentially from an upstream end 82 as far as a downstream end 84. The elastically flexible strip 80 is made of a flexible metallic material, such as spring steel. More particularly, the elastically flexible strips 80 are fixed by rivets 86 or like fastener to the associated preload teeth 77. For this purpose, each of the preload teeth 77 has a fixing orifice 79, as illustrated on FIG. 4. Alternatively, the deformable element is formed by a spring, for example a coil or accordion spring, of tangential direction whose first upstream end is fixed to the preload tooth upstream while the second downstream end is fixed to the downstream preload tooth. The coil spring is in a circumferentially compressed state whenever the lock-up clutch is mounted in its disengaged position.

During assembly of the lock-up clutch 18, the backing discs 72A and 72B are axially stacked on both sides of the friction disc 70. Then, the elastic strips 80 are fixed between the preload teeth 77 of each of the backing discs 72A and 72B. Thus the stack forms a module which is elastically deformable both axially and torsionally at the same time.

As discussed above, the turbine-piston 32 is axially moveable toward and away from the impeller shell 20 between the lockup position and the non-lockup (open) position. Axial movement of the turbine-piston 32 is accomplished by changing the pressure differential across the opposite sides of the turbine-piston shell 35. A pressure increase in the damper chamber 54 relative to the torus chamber 52 (or stated differently, a pressure decrease in the torus chamber 52 relative to the damper chamber 54) shifts the turbine-piston 32 axially in the direction of torque transmission, i.e., towards the output side of the casing 12, that is right to left in FIG. 1, into the lockup position. On the other hand, a pressure decrease in the damper chamber 54 relative to the torus chamber 52 (or stated differently a pressure increase in the torus chamber 52 relative to the damper chamber 54) shifts the turbine-piston shell 35 and the drive member 56 affixed thereto axially against the direction of torque transmission, i.e., towards the input side of the casing, that is left to right in FIG. 1, out of the lockup position. Pressure changes are created by control of the fluid, e.g., hydraulic fluid or oil, in the chambers 52 and 54.

In the lockup mode, the turbine-piston shell 35 is displaced axially toward the first sidewall 24 of the first casing shell 20 until the piston engagement surface 66 of the actuating portion 64 of the input member 50 (which moves axially with the turbine-piston shell 35) is pushed axially toward the engagement surface 29 of the first sidewall 24 of the first casing shell 20 and causes clamping of the friction disc 70 between the backing discs 72A and 72B of the lock-up clutch 18 so as to non-rotationally frictionally couple the input member 50 (thus, the turbine-piston 32) with the casing 12 through the lock-up clutch 18. Thus, torque is transferred from the engine to the output hub 40 via the torsional vibration damper 16, bypassing the torque converter 14 through the lock-up clutch 18 and the torsional vibration damper 16.

In the non-lockup mode, the turbine-piston 32 is displaced axially away from the first casing shell 20 of the casing 12, axially moving the actuating portion 64 of the input member 50 away from the piston engagement surface 66 of the actuating portion 64 of the input member 50 until the actuating portion 64 is spaced from the friction disc 70 and the backing discs 72A, 72B of the lock-up clutch 18 and no longer non-rotatably frictionally coupled to the casing 12 through the lock-up clutch 18. Thus, torque is transferred from the engine to the output hub 40 through the torsional vibration damper 16 in a hydrodynamic transmission mode, and does not bypass the torque converter 14 through the lock-up clutch 18.

In the lockup mode, the friction disc 70 and the backing discs 72A, 72B of the lock-up clutch 18 are pressed together by the actuating portion 64 of the input member 50 against the engagement surface 29 of the first casing shell 20, such that the turbine-piston 32 is frictionally non-rotatably coupled (i.e., mechanically locked) to the casing 12 through the lock-up clutch 18, thereby mechanically positively coupling the turbine-piston 32 to the casing 12. When not in the lockup mode, i.e., in the hydrodynamic transmission mode, the lock-up clutch 18 and the actuating portion 64 of the input member 50 are spaced from one another, such that the turbine-piston 12 is not frictionally non-rotatably coupled to the casing 12 through the lock-up clutch 18. In the non-lockup mode, normal operation of the torque converter 14 hydrodynamically couples and decouples the impeller 30 to and from the turbine-piston 32.

In operation, the lockup clutch 18 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be somewhat thicker than typical turbine shells that do not form or function as the lockup piston. Although not shown, a biasing member, such as a spring (e.g., a washer spring), may be included in the hydrokinetic torque coupling device 10 to axially urge the turbine-piston 32 into or out of lockup mode.

An exemplary method for assembling the hydrokinetic torque coupling device 10 according to the embodiment of FIGS. 1-4 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling device 10 may be practiced by sequentially performing the steps as set forth below, it should be understood that the methods may involve performing the steps in different sequences.

The impeller 30, the turbine-piston 32, the stator 34, the torsional vibration damper 16 and the lock-up clutch 18 may each be preassembled. The turbine-piston 32 includes, as noted above, the turbine-piston shell 35, the turbine-piston core ring 46, the turbine blades 36 extending between and attached to the turbine-piston shell 35 and the turbine-piston core 46, and the turbine-piston flange 38.

The impeller 30, the stator 34, and the turbine-piston 32 subassemblies are assembled together, preferably as shown in the drawings, so that form the torque converter 14. Then, the input member 50 of the torsional vibration damper 16 is fixedly secured to the turbine shell 35 of the turbine-piston 32 by appropriate means, such as by weldment 51 (as best shown in FIG. 2) or rivets. Next, the friction disc 70 and the backing discs 72A, 72B of the lock-up clutch 18 are mounted to the first casing shell 20 of the casing 12 so that the radial guide teeth 76 and 77 (i.e., 76A, 76B and 77A, 77B) of the backing discs 72A, 72B slide axially between the complementary grooves 27 of the first outer wall portion 26₁ of the first casing shell 20 of the casing 12. At the same time, the friction disc 70 is positioned between the backing discs 72A, 72B. The, the first casing shell 20 of the casing 12 with the lock-up clutch 18 is mounted to the second casing shell 22 of the casing 12, so that the guide teeth 74 of the friction disc 70 slide axially into the axial grooves 68 of the connection portion 62 of the input member 50. After that, the first and second casing shells 20 and 22 are fixedly (i.e., non-moveably) connected together, such as by welding at weld 19 at their outer peripheries.

Various modifications, changes, and alterations may be practiced with the above-described exemplary embodiment shown in FIGS. 1-4.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the hydrokinetic torque coupling device comprising:
    a casing rotatable about a rotational axis and comprising an impeller shell and a cover shell non-moveably connected to the impeller shell;
    a torque converter coaxially aligned with and rotatable about the rotational axis, the torque converter disposed within the casing and comprising an impeller and a turbine-piston hydro-dynamically drivable by the impeller and coaxially aligned with the impeller, the turbine-piston being axially movable toward and away from the casing to position the hydrokinetic torque coupling device into and out of a lockup mode in which the turbine-piston is non-rotatably frictionally coupled to the casing;
    a torsional vibration damper comprising:
        an input member rotatable about the rotational axis and non-movably secured to the turbine-piston, the input member including an actuating portion;
        a first retainer plate rotatable relative to the input member coaxially with the rotational axis; and
        a plurality of damper elastic members interposed between the first retainer plate and the input member, the damper elastic members elastically coupling the input member to the first retainer plate; and
    a lockup clutch disposed within the casing between the input member and the cover shell of the casing for frictionally coupling the casing and the turbine-piston, the actuating portion of the input member configured to actuate the lockup clutch.

2. The hydrokinetic torque coupling device as defined in claim 1, further comprising an output hub elastically coupled to the turbine-piston via the torsional vibration damper; and wherein the first retainer plate of the torsional vibration damper is non-rotatably secured to the output hub.

3. The hydrokinetic torque coupling device as defined in claim 1, wherein the torsional vibration damper further comprises a second damper retainer plate non-movably secured to the first damper retainer plate coaxially with the rotational axis, wherein the damper elastic members are disposed axially between the first and second damper retainer plates, and wherein the second damper retainer plate is elastically connected to the input member via the damper elastic members.

4. The hydrokinetic torque coupling device as defined in claim 3, further comprising an output hub elastically coupled to the turbine-piston via the torsional vibration damper, and wherein both the first and second damper retainer plates of the torsional vibration damper are non-rotatably secured to the output hub.

5. The hydrokinetic torque coupling device as defined in claim 1, wherein the input member further includes an annular, radially extending central portion coaxial with the rotational axis, an annular connection portion formed integrally with and extending substantially axially from the central portion, and wherein the actuating portion is formed integrally with and radially outwardly extends from the connection portion.

6. The hydrokinetic torque coupling device as defined in claim 1, wherein the lockup clutch is disposed between the cover shell and the turbine-piston.

7. The hydrokinetic torque coupling device as defined in claim 1, wherein the damper elastic members are disposed circumferentially in series relative to each other.

8. A hydrokinetic torque coupling device for coupling together a driving shaft and a driven shaft, the hydrokinetic torque coupling device comprising:
    a casing rotatable about a rotational axis and comprising an impeller shell and a cover shell non-moveably connected to the impeller shell;
    a torque converter coaxially aligned with and rotatable about the rotational axis, the torque converter disposed within the casing and comprising an impeller and a turbine-piston hydro-dynamically drivable by the impeller and coaxially aligned with the impeller, the turbine-piston being axially movable toward and away from the casing to position the hydrokinetic torque coupling device into and out of a lockup mode in which the turbine-piston is non-rotatably frictionally coupled to the casing;
    a torsional vibration damper comprising:
        an input member rotatable about the rotational axis and non-movably secured to the turbine-piston, the input member including an actuating portion;
        a first retainer plate rotatable relative to the input member coaxially with the rotational axis; and
        a plurality of damper elastic members interposed between the first retainer plate and the input member, the damper elastic members elastically coupling the input member to the first retainer plate; and
    a lockup clutch disposed within the casing between the input member and the cover shell of the casing for frictionally coupling the casing and the turbine-piston, the actuating portion of the input member configured to actuate the lockup clutch;

the lock-up clutch including a friction disc non-rotatably coupled to and axially movable relative to the input member of the torsional vibration damper, the friction disc disposed axially between the casing and the actuating portion of the input member, the actuating portion of the input member configured to press the friction disc axially in the direction toward the casing so as to frictionally lock the turbine-piston to the casing in the lockup mode.

9. The hydrokinetic torque coupling device as defined in claim 8, wherein the input member of the torsional vibration damper has a plurality of axial grooves circumferentially spaced from one another, and wherein the friction disc comprises radial guide teeth extending radially inwardly from an inner peripheral edge thereof and engaging the axial grooves of the input member such that the friction disc is axially slideable and non-rotatable relative to the input member.

10. The hydrokinetic torque coupling device as defined in claim 8, wherein the lock-up clutch further includes a first backing disc non-rotatably coupled to and axially movable relative to the casing, and wherein the first backing disc is disposed axially between the cover shell of the casing and the friction disc.

11. The hydrokinetic torque coupling device as defined in claim 10, wherein the casing has a plurality of axial grooves formed integrally therewith and circumferentially spaced from one another, and wherein the first backing disc comprises radial guide teeth extending radially outwardly from an outer peripheral edge thereof and engaging the axial grooves of the casing such that the first backing disc is axially slideable and non-rotatable relative to the casing.

12. The hydrokinetic torque coupling device as defined in claim 11, wherein the lock-up clutch further includes a second backing disc non-rotatably coupled to and axially moveable relative to the casing, and wherein the second backing disc is disposed axially between the actuating portion of the input member and the friction disc.

13. The hydrokinetic torque coupling device as defined in claim 12, wherein the casing has a plurality of axial grooves formed integrally therewith and circumferentially spaced from one another, and wherein the second backing disc comprises radial guide teeth extending radially outwardly from an outer peripheral edge thereof and engaging the axial grooves of the casing such that the second backing disc is axially slideable and non-rotatable relative to the casing.

14. The hydrokinetic torque coupling device as defined in claim 13, further comprising an elastic preload element exerting a preload torque to clamp one of the guide teeth of at least one of the first and second backing discs circumferentially against one of faces of one of the axial grooves of the casing, the elastic preload element is interposed axially between the guide tooth of the first backing disc and the guide tooth of the second backing disc, the elastic preload element is mounted circumferentially loaded so as to exert a circumferential force so as to produce the preload torque to separate the guide teeth of the first and second backing discs circumferentially against each of the upstream and downstream faces of one of the guide grooves of the casing.

15. The hydrokinetic torque coupling device as defined in claim 14, wherein the elastic preload element is an elastically deformable element formed by at least one elastically flexible strip oriented circumferentially, wherein an upstream end of the elastically flexible strip is fixed to the guide tooth of the first backing disc, and wherein a downstream end of the elastically flexible strip is fixed to the guide tooth of the second backing disc.

16. The hydrokinetic torque coupling device as defined in claim 15, wherein, in its non-loaded state, the elastically flexible strip is axially cambered so that its upstream end is offset axially with respect to its downstream end, wherein elastically flexible strip is in a loaded state whenever the turbine-piston is in the non-lockup mode so as to produce the preload torque.

17. The hydrokinetic torque coupling device as defined in claim 12, wherein the first and second backing discs are non-rotatably coupled to and axially moveable relative to the cover shell of the casing, and wherein the friction disc is interposed axially between the first and second backing discs.

18. A method of assembling a hydrokinetic torque coupling device for coupling together a driving shaft and a driven shaft together, comprising the steps of:

providing an impeller shell and a cover shell of a casing;

providing a preassembled torque converter comprising an impeller, a turbine-piston and a stator;

providing a preassembled torsional vibration damper rotatable about a rotational axis and comprising:

an input member including an actuating portion;

a first retainer plate coaxially with and rotatable relative to the input member; and a plurality of damper elastic members interposed between the first retainer plate and the input member, the damper elastic members elastically coupling the input member to the first retainer plate;

non-moveably securing the input member of the torsional vibration damper to the turbine-piston of the torque converter coaxially with the rotational axis;

mounting a lockup clutch within the cover shell of the casing;

mounting the cover shell to the impeller shell so that the lockup clutch is disposed between the input member and the cover shell coaxially with the rotational axis for frictionally coupling the casing and the turbine-piston; and non-moveably securing the impeller shell to the cover shell so as to define the casing.

19. The method as defined in claim 18, wherein the lock-up clutch includes a friction disc (70), and wherein the step of mounting the cover shell to the impeller shell includes the step of mounting the friction disc to the input member axially between the casing and the actuating portion (64) of the input member (50) so that the friction disc (70) is axially moveable and non-rotatable relative to the input member (50).

20. The method as defined in claim 19, wherein the lock-up clutch (18) further includes a first backing disc (72A) disposed axially between the casing (12) and the friction disc (70), and wherein the step of mounting the lockup clutch (18) within the cover shell (24) of the casing (12) includes the step of mounting the first backing disc (72A) to the cover shell (24) of the casing (12) axially between the casing (12) and the friction disc (70) so that the first backing disc (72A) is axially moveable and non-rotatable relative to the cover shell (24).

* * * * *